E. M. BARNES.
VEHICLE SPRING.
APPLICATION FILED SEPT. 19, 1917.

1,294,370.

Patented Feb. 18, 1919.

Inventor
Edward M. Barnes
By Moulton & Lunance
Attorneys.

UNITED STATES PATENT OFFICE.

EDWARD M. BARNES, OF HASTINGS, MICHIGAN.

VEHICLE-SPRING.

1,294,370.  Specification of Letters Patent.  Patented Feb. 18, 1919.

Application filed September 19, 1917. Serial No. 192,106.

*To all whom it may concern:*

Be it known that I, EDWARD M. BARNES, a citizen of the United States of America, residing at Hastings, in the county of Barry and State of Michigan, have invented certain new and useful Improvements in Vehicle-Springs; and I do hereby declare the following to be a full, clear, and exact description of the invention, such as will enable others skilled in the art to which it appertains to make and use the same.

This invention relates to a spring adapted for use in vehicles of various kinds. The invention is particularly concerned with improvements in leaf spring constructions whereby the same may be readily and easily lubricated and will hold a relatively large amount of lubricant such that after once lubricated it is not necessary to again replenish the supply for a considerable length of time. It is the primary object and purpose of the invention to construct a leaf spring in such manner that this desirable end is attained and at the same time make a construction which can be manufactured substantially at the same cost as other types of leaf springs not equipped with such lubricating feature.

Figure 1:
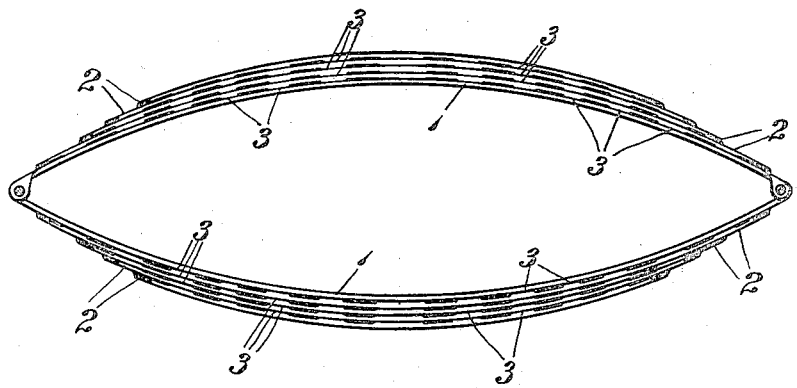

For an understanding of the invention reference may be had to the accompanying drawing showing the same, in which, Figure 1 is an elevation of a full elliptic leaf spring in which my invention is incorporated.

Figure 2:
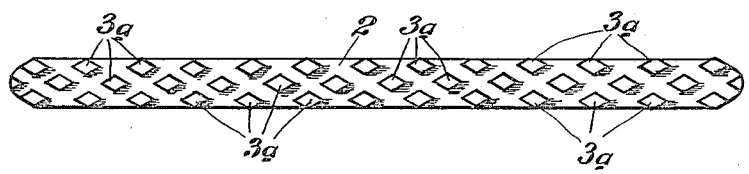
Figure 3:
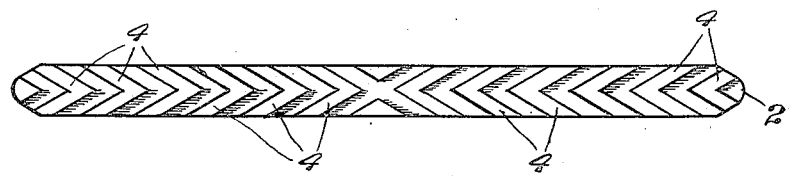
Figure 4:
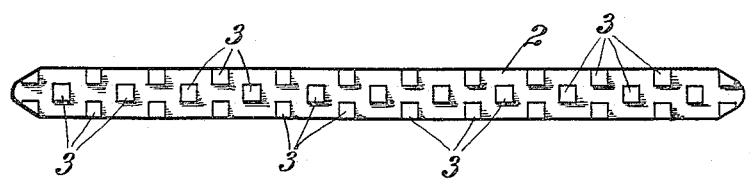
Figure 5:
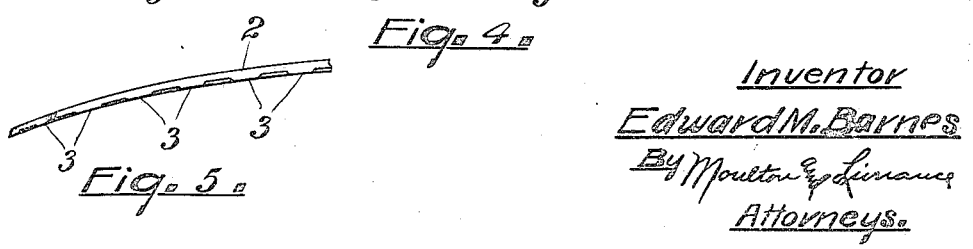

Figs. 2, 3, and 4 are views of one side of a leaf, a plurality of which are used in the construction of the complete spring, said figures illustrating various modifications in the formation of said side of the leaf, and Fig. 5 is a fragmentary edge view of one leaf of the spring.

Like reference characters refer to like parts in the several views of the drawing.

In the construction of a leaf spring in which my invention is employed, the usual main leaf 1 is used, both sides of which are smooth. The auxiliary leaves 2 are associated with the main leaves in the usual manner, being progressively of shorter lengths and located in contact with each other in the usual and well known manner. One side of each of the auxiliary leaves is smooth the same as are both sides of the main leaf 1. The opposite side of the leaf is provided with a plurality of separated projections such as indicated at 3 in Fig. 4, 3ᵃ in Fig. 2, and 4 in Fig. 3, it being nonessential what particular form of projection is used so long as the entire side of the leaf is provided with a large number of separated projections between and around which are spaces into which a lubricating material may be entered.

In the assembly of the spring, a leaf 2 is placed in contact with the main spring 1, the projections 3, 3ᵃ or 4 bearing against one side of said leaf 1, and the additional auxiliary leaves 2 are likewise placed upon the first leaf and upon each other, the side of each leaf having the projections being in contact with the smooth side of the adjacent leaf. When the spring is assembled, lubricating material is placed between the various leaves to fill the spaces around the projections 3, 3ᵃ or 4. It is apparent that with a leaf spring constructed in this manner, a large amount of lubricant may be placed between the leaves when the same are assembled or entered readily between the same afterward, and it is also apparent that the friction between the leaves is greatly lessened by reason of the fact that the only bearing points between adjacent leaves are those made by the projections 3, 3ᵃ or 4.

In Fig. 1 I have shown a full elliptic spring but it is of course apparent that the invention is not limited in any respect to the one type of spring shown. If the upper half of the spring only is used, as is the case in many motor vehicles, the invention is quite as readily adapted for such half elliptic spring as for the full elliptic. In some cases a three-fourths elliptic spring is used but the invention in any case and the use thereof is the same. It is also apparent that any other designs or projections on one side of the auxiliary leaves may be used. Furthermore, leaves of this character may be manufactured by rolling the same with a proper roller with no additional expense for labor and with a very slight additional expense for material, it being contemplated that the leaves shall be of the same thickness as the smooth leaves used heretofore and that the only additional material is that necessary for the projections 3, which are of very limited height, not over a few hundredths of an inch at the most.

I claim:

1. A vehicle spring of the leaf type, comprising a plurality of leaves positioned in contact engagement with each other, a contact surface on one leaf being smooth and the co-acting contact surface on the adjacent leaf being provided with a large number of separated projections disposed in the length of the spring with shallow recessed portions between the projections adapted to receive lubricant, substantially as and for the purpose described.

2. A leaf for a leaf spring formed of flat spring material, and having one side smooth and the opposite side formed with a large number of relatively small and separated projections having flat outer surfaces and disposed the full length of said leaf, substantially as described.

3. A leaf for a leaf spring having a side thereof formed with a large number of separated projections having flat outer surfaces, substantially as described.

4. A vehicle spring of the leaf type comprising a main leaf of flat spring material smooth on both sides, and a plurality of leaves of shorter length also formed of flat spring material, each being smooth on one side and provided with a large number of separated short projections having flat outer surfaces on the other side, the smooth side of a leaf contacting with the flat outer surfaces of the projections on the side of an adjacent leaf, substantially as described.

In testimony whereof I affix my signature.

EDWARD M. BARNES.